United States Patent
Kosaka

(10) Patent No.: US 7,062,250 B1
(45) Date of Patent: Jun. 13, 2006

(54) RADIO COMMUNICATION TERMINAL HAVING VARIABLE DATA TRANSMISSION SPEED RESPONSIVE TO BUILT-IN BATTERY POWER

(75) Inventor: Akio Kosaka, Chiryu (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 09/354,945

(22) Filed: Jul. 15, 1999

(30) Foreign Application Priority Data

Jul. 29, 1998 (JP) ............................ 10-214477
Nov. 2, 1998 (JP) ............................ 10-312030

(51) Int. Cl.
*H04B 1/16* (2006.01)

(52) U.S. Cl. .................... 455/343.5; 455/452.2; 455/574; 455/573; 455/127.5; 320/114; 379/433.08

(58) Field of Classification Search ................ 455/550, 455/575, 569, 127, 343, 450–452.2, 464, 455/522, 556.1, 556.2, 557, 572–574, 90.1, 455/90.2, 127.1, 127.5, 343.1–343.6; 370/311; 320/114, 162–164; 379/413, 433.08
See application file for complete search history.

(56) References Cited

U.S. PATENT DOCUMENTS

| 5,280,198 | A | * | 1/1994 | Almulla | 307/296.6 |
| 5,477,340 | A | * | 12/1995 | Hasegawa | 358/438 |
| 5,519,757 | A | * | 5/1996 | Torin | 379/58 |
| 5,627,882 | A | * | 5/1997 | Chien et al. | 455/464 |
| 5,640,691 | A | * | 6/1997 | Davis et al. | 455/126 |
| 5,678,229 | A | * | 10/1997 | Seki et al. | 455/343 |
| 5,794,137 | A | * | 8/1998 | Harte | 455/343 |
| 5,848,062 | A | * | 12/1998 | Ohno | 370/311 |
| 5,870,685 | A | * | 2/1999 | Flynn | 455/573 |
| 5,896,202 | A | * | 4/1999 | Ozaki | 358/296 |
| 5,949,484 | A | * | 9/1999 | Nakaya et al. | 348/384 |
| 5,949,812 | A | * | 9/1999 | Turney et al. | 375/200 |
| 5,989,480 | A | | 11/1999 | Yamazaki | |
| 6,026,303 | A | * | 2/2000 | Minamisawa | 455/446 |
| 6,044,067 | A | * | 3/2000 | Suzuki | 370/252 |
| 6,263,200 | B1 | * | 7/2001 | Fujimoto | 455/343 |
| 6,275,712 | B1 | * | 8/2001 | Gray et al. | 455/522 |

FOREIGN PATENT DOCUMENTS

| JP | A-1-296885 | 11/1989 |
| JP | 6-237542 | 8/1994 |
| JP | A-787379 | 3/1995 |

(Continued)

OTHER PUBLICATIONS

Japanese Notice of Rejection dated Dec. 21, 2004 in corresponding Japanese Patent Application No. 10-312030, with English translation.

*Primary Examiner*—Charles Craver
(74) *Attorney, Agent, or Firm*—Harness, Dickey & Pierce, PLC

(57) ABSTRACT

In a cellular video telephone having a built-in battery, the remaining electric power of the battery is detected. The data communication speed and the display of image on a display are variably controlled based on the detected remaining battery power, that is, the communication speed is lowered and the display is turned off, as the remaining power decreases. Alternatively or in addition, the communication speed and the image display are controlled variably based on availability of external power source in the course of voice and image communication.

2 Claims, 5 Drawing Sheets

FOREIGN PATENT DOCUMENTS

| | | |
|---|---|---|
| JP | A-8-9347 | 1/1996 |
| JP | 8-070273 | 3/1996 |
| JP | 9-084119 | 3/1997 |
| JP | A-9-130284 | 5/1997 |
| JP | 09-186981 | 7/1997 |
| JP | A-205396 | 8/1997 |
| JP | 10-108099 | 4/1998 |
| JP | 10-190564 | 7/1998 |

* cited by examiner

RADIO COMMUNICATION TERMINAL HAVING VARIABLE DATA TRANSMISSION SPEED RESPONSIVE TO BUILT-IN BATTERY POWER

CROSS REFERENCE TO RELATED APPLICATION

This application relates to and incorporates herein by reference Japanese Patent Applications No. 10-214477 filed on Jul. 29, 1998 and No. 10-312030 filed on Nov. 2, 1998.

BACKGROUND OF THE INVENTION

1. Field of the Invention

The present invention relates to a radio communication terminal operable with electric power supplied from its built-in battery, and particularly to a cellular video telephone.

2. Related Art

JP-A-8-9347 discloses a cellular video telephone having a built-in or internal battery therein. This device has a power monitoring circuit, which detects remaining electric power of the built-in battery, and prolongs communication period by varying data transmission speed in response to the detected remaining battery power. Specifically, a frame rate, which is the number of picture images to be coded and transmitted per second, is calculated based on the detected remaining battery power, and dynamic or real-time image signals are coded by an image coding circuit at the calculated frame rate. Thus, the power consumption in the image coding circuit is reduced as the remaining battery power decreases, while reducing motions of dynamic images which results in lessening of the quality of dynamic image display to some extent. However, the reduction in the power consumption of the image coding circuit is still small in comparison with the total power consumption of the cellular video telephone.

SUMMARY OF THE INVENTION

It is therefore an object of the present invention to provide a radio communication terminal operable with its built-in battery, which has lower power consumption and longer communication period.

It is another object of the present invention to provide a radio communication terminal operable with its built-in battery, which transmits data at higher communication speeds with less power consumption of the built-in battery.

According to the present invention, a radio communication terminal such as a cellular video telephone has a built-in battery. The remaining electric power of the battery is detected. The data communication speed and the display of image on a display are variably controlled based on the detected remaining battery power, that is, the communication speed is lowered and the display is turned off, as the remaining battery power decreases. In addition or alternatively, the communication speed and the image display are controlled variably based on availability of an external power source in the course of communication. That is, as long as the built-in battery is being charged by the external power source, the communication speed as well as the quality of dynamic image display is increased than when the built-in battery is not being charged.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

Figure 1:
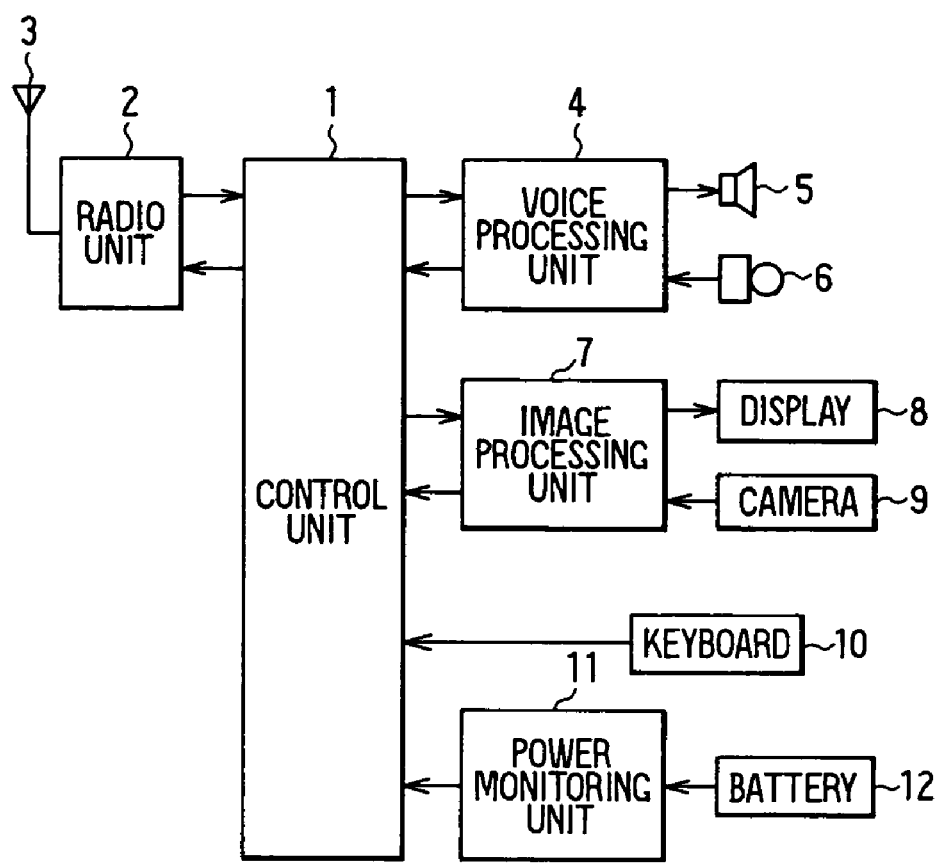
FIG. 1 is a block diagram showing a radio communication terminal according to a first embodiment of the invention.

The present invention will be described in further detail with reference to two embodiments, in which the same or like parts are designated with the same or like reference numerals. The embodiments are directed to a cellular video telephone, which communicates with both voice and dynamic images. In the embodiments, a communication or access may be carried out in the CDMA (code-divided multiple access) processing using divided codes or a TDMA (time-divided multiple access) processing.

First Embodiment

Referring first to FIG. 1, a cellular video telephone comprises a control unit 1, which includes a programmed microcomputer and is connected to a radio unit (transmitter/receiver) 2 connected to an antenna 3 through its transmitter/receiver terminal.

The control unit 1 is connected to a voice processing unit 4, which is connected to a speaker 5 for outputting sound messages and a microphone 6 for inputting sounds. The control unit 1 is connected to an image processing unit 7, which is connected to a display 8 for displaying picture images and a camera 9 for inputting picture images. The control unit 1 is further connected to a keyboard unit 10 having a number of key buttons labeled as POWER, SEND, END, IMAGE, numeric figures 0–9 and the like.

Further, the control unit 1 is connected to a power monitoring circuit 11, which includes an analog/digital (A/D) circuit connected to a built-in battery 12. The battery 12 is connected to supply the above units with electric power. The voltage of the battery decreases as the remaining or available electric power of the battery 12 decreases. The power monitoring unit 11 detects the voltage of the battery 12, so that the control unit 1 may calculate the remaining power of the battery 12 from the detected battery voltage.

The control unit 1, particularly the microprocessor therein, is programmed to effectuate the following operation in generally known manner.

That is, when a user of the cellular video telephone presses the POWER button on the keyboard unit 10, the video telephone is enabled to operate with the electric power supplied from the battery 12. The antenna 3 receives radio signals from nearby base stations and transmits a signal having the highest electric field to the radio unit 2 as a high frequency signal. The radio unit 2 responsively transmits the received signal to the control unit 1 after converting it into a base band signal by a high frequency amplifier, a receiver mixer and the like. The control unit 1 demodulates the base band signal to provide a report information included in the received radio signal. If registration of location is required in the report information, the control unit 1 converts a location registration information into a transmission base band signal to be transmitted to the radio unit 2 in return. The radio unit 2 converts the transmission base band signal into a high frequency signal by a transmitter mixer and transmits it as a radio signal from the antenna 3 through a power amplifier and the like. Thus, the cellular video telephone, particularly the control unit 1, is put in a wait condition.

In issuing calls, the user (caller) inputs a phone number of an opponent user (call-receiver) through key operations on the keyboard unit 10. The control unit 1 responsively causes the image processing unit 7 to display the inputted phone number on the display 8. When the user presses the SEND button on the keyboard unit 10 after checking the displayed phone number to effectuate calling, the user is enabled to start communication. Voice of the user is converted into an electric signal by the microphone 6 and is applied to the voice processing unit 4 as a voice signal. The voice processing unit 4, after amplifying and converting the voice signal into a corresponding digital signal, compresses the converted voice signal into a low bit rate signal by its voice coding circuit. This low bit rate voice data signal is applied to the control unit 1.

When the user presses the IMAGE button on the keyboard unit 10, the image of the user is converted into an image signal by the camera 9 to be applied to the image processing unit 7 as long as a high speed data transmission in excess of 64 k bps is possible due to good radio transmission condition. The image processing unit 7, after amplifying and converting the image signal into a corresponding digital signal, compresses the converted image signal into a low bit rate signal by its image coding circuit. This low bit rate image data signal is applied to the control unit 1.

The control unit 1 subjects those voice data signal and the image data signal into the code-divided multiplex access (CDMA) processing and digital modulation to transmit the resulting signal to the radio unit 2 as a base band signal. The radio unit 2 responsively converts this base band signal into a high frequency signal and transmits it from the antenna 3 to the base station after power amplification.

When the antenna 3 receives a radio signal from the base station in return, it transmits the received radio signal to the radio unit 2 as a high frequency signal. The radio unit 2 converts this high frequency signal into a base band signal to be transmitted to the control unit 1. The control unit 1 demodulates and converts the base band signal into a voice data signal and an image data signal by subjecting it to the CDMA processing.

The voice processing unit 4 expands the received voice data signal by a voice demodulation circuit into a corresponding digital voice signal, which is in turn converted into an analog voice signal to drive the speaker 5 for providing a voice message. The image processing unit 7 similarly expands the received image data signal by an image demodulation circuit into a corresponding digital image signal, which drives the display 8 to provide an image of an opponent user or the like.

In receiving calls, a call message is transmitted from the base station to be received by the antenna 3 under the wait condition. The radio unit 2 converts a received radio signal into a base band signal to be transmitted to the control unit 1. The control unit 1 processes this base band signal and recognizes an arrival of message to effectuate a call-responsive operation such as ringing. After this operation, the same operation as described above with respect to the call-issuing operation is carried out.

Figure 2:
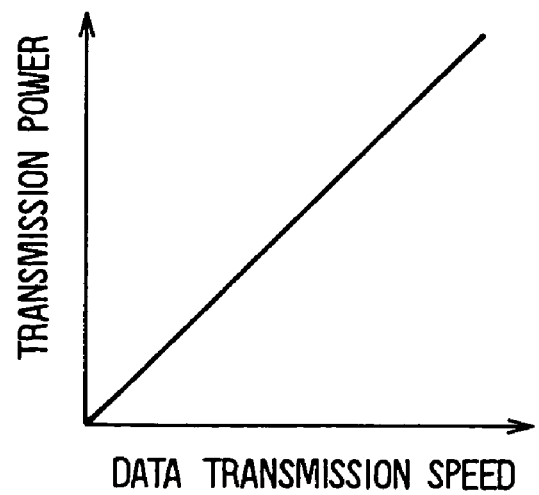
FIG. 2 is a graph showing a relation between data transmission speed and electric power consumption of the radio communication terminal shown in FIG. 1.

In the above operations, high speed communication is enabled by the use of the multiple coding method in the case of CDMA and by the use of the multiple slotting method in the case of TDMA. For instance, the communication speed is increased three times by the use of three multiple codes in the case of CDMA and by the use of three multiple slots in the case of TDMA. In those instances, however, as shown in FIG. 2, the transmission power or electric power consumption for transmitting the voice data and image data from the antenna 3 increases as the data transmission speed increases, thus shortening the communication period.

Therefore, the control unit 1, particularly the microcomputer, is so programmed that the data communication speed is variably controlled based on the remaining electric power of the built-in battery 12.

Figure 3:
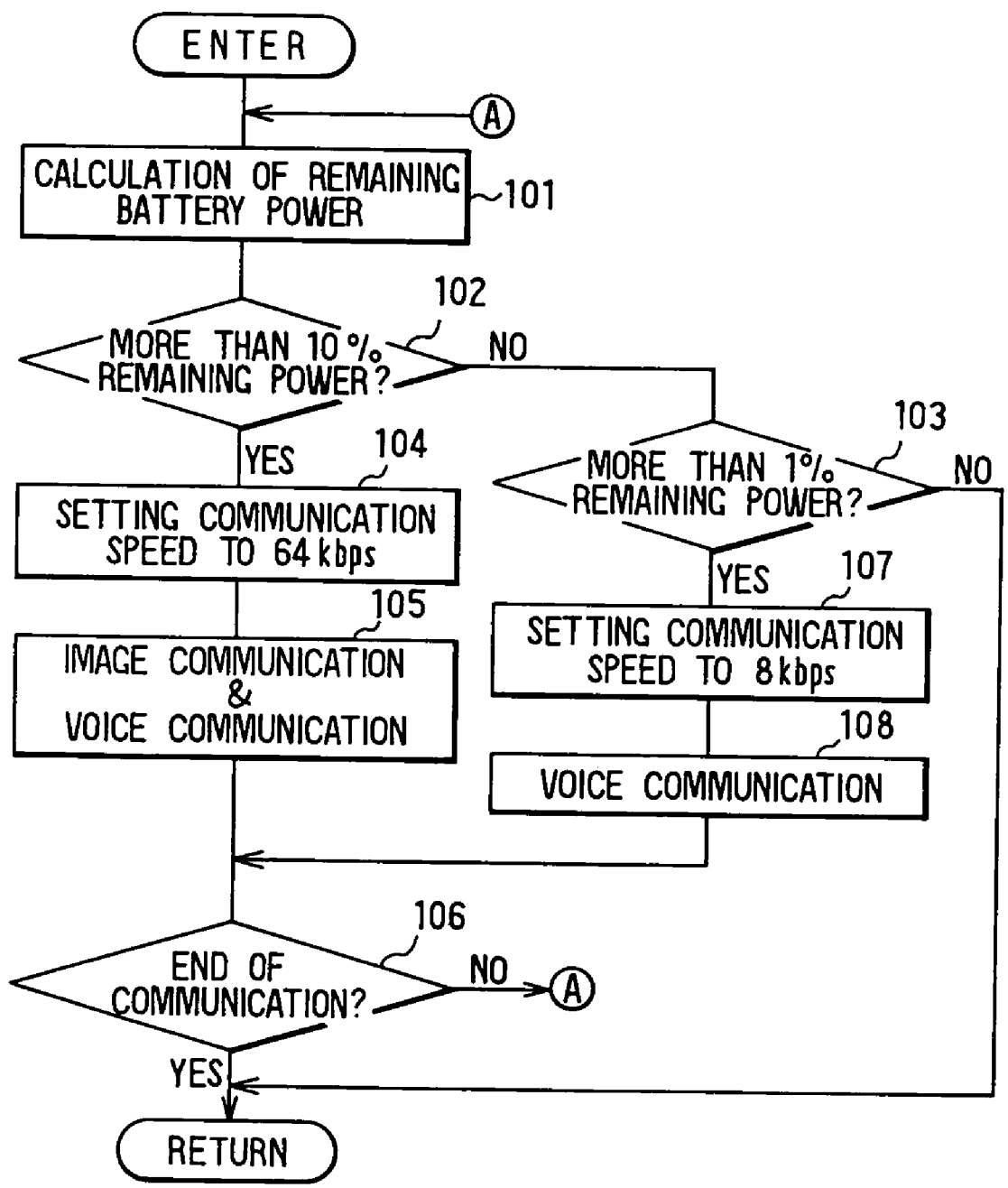
FIG. 3 is a flow diagram showing a communication control routine of the radio communication terminal shown in FIG. 1.

Specifically, the control unit 1 proceeds from a main control routine to the call-issuing control routine shown in FIG. 3, when the phone number to be called is input and the SEND button is pressed through the keyboard unit 10. The control unit 1 calculates first at step 101 the remaining electric power of the built-in battery 12 based on the battery voltage detected by the power monitoring circuit 11, and then checks at step 102 whether the calculated remaining power is more than 10% of the maximum power.

If the remaining power is less than 10% (NO), the control unit 1 further checks at step 103 whether it is more than 1%. If the remaining power is more than 10% (YES), the control unit 1 sets the data communication or transmission speed to 64 k bps at step 104, and then effectuates the image communication mode and the voice communication mode at step 105. In this image communication mode, the control unit 1 causes the image processing unit 7 to reproduce the opponent user (call-receiver) on the display 8 and to receive the image of the user (caller) through the camera 9. In the voice communication mode, the control unit 1 causes the voice processing unit 4 to reproduce the voice of the opponent user through the speaker 5 and to receive the voice of the user through the microphone 6. Thus, this communication mode effectuates both the voice communication and the image communication.

The control unit 1 then proceeds to step 106 to check whether it is an end of the communication. If the check result is YES indicating that the END button on the keyboard unit 10 is pressed or the communication is terminated at the opponent user side, the control unit 1 returns to the main routine to execute a communication termination processing. If the check result at step 106 is NO, the control unit 1 returns to step 101 to repeat the above sequence of processing.

Further, if it is determined at step 103 that the remaining power is more than 1% (YES), the control unit 1 sets the communication speed to a lower speed, 8 k bps, at step 107. After step 107, the control unit 1 enables only the voice communication at the speed of 8 k bps at step 108. The control unit 1, however, returns to the main routine to execute the communication termination processing if the remaining power is determined to be less than 1% (NO) at step 103, thus disabling both of the voice communication and the image communication.

In the voice communication mode at step 108, the control unit 1 causes the voice processing unit 4 to reproduce the voice of the opponent user through the speaker 5 and to receive the voice of the user through the microphone 6. The control unit 1 further disables the image processing unit 7 to operate normally. That is, the image processing unit 7 is enabled to continue to display on the display 8 only the last one of the dynamic images displayed in the image communication mode by storing one frame of image in its memory, and the electric power supply to the camera 9 is turned off.

In the above embodiment, the transmission speeds, 8 k bps and 64 k bps, are determined in view of the fact that more than 64 k bps is normally required for the image communication along with the voice communication, although 8 k bps is normally sufficient for the voice communication. The control unit 1 may be programmed to turn off the electric power supply to the display 8 at step 108 or in response to a keyboard operation by the user. Further, the control unit 1 may be programmed to change the communication speeds to more than two speeds depending on the remaining battery power.

Thus, as the control unit 1 decreases the data communication speed with the decrease in the remaining power of the battery 12, the longevity of the battery 12 is prolonged so that the communication period may be prolonged. Further, as only the voice communication is enabled automatically when the remaining battery power decreases, the communication with the opponent user (call-receiver) can still be maintained without image display. The user is enabled to recognize the decrease in the battery power through the motionless image of the opponent user on the display 8. The user can convey it to the opponent user through the voice communication indicating a later call.

Second Embodiment

Figure 4:
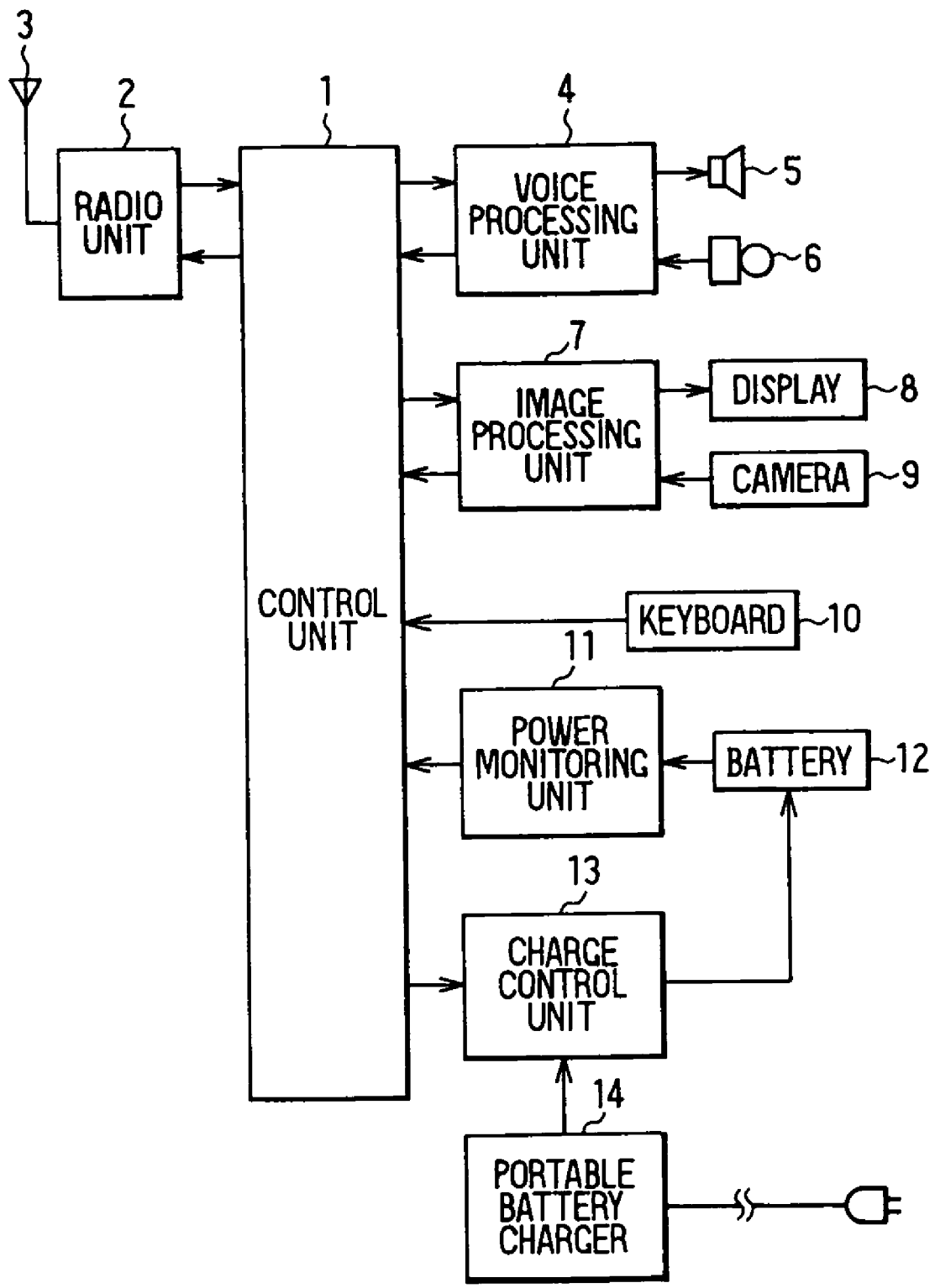
FIG. 4 is a block diagram showing a radio communication terminal according to a second embodiment of the invention.
Figure 5:
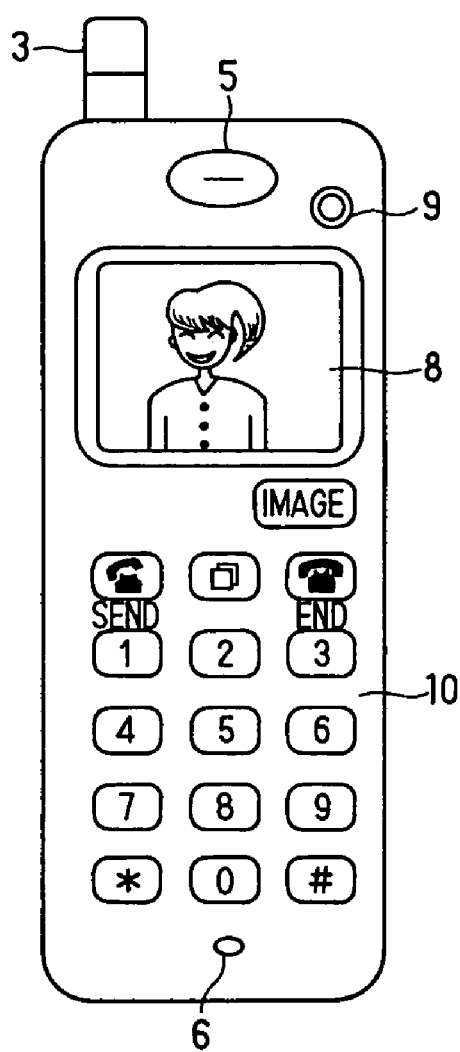
FIG. 5 is a schematic view showing an outlook of the radio communication terminal shown in FIG. 4.
Figure 5:
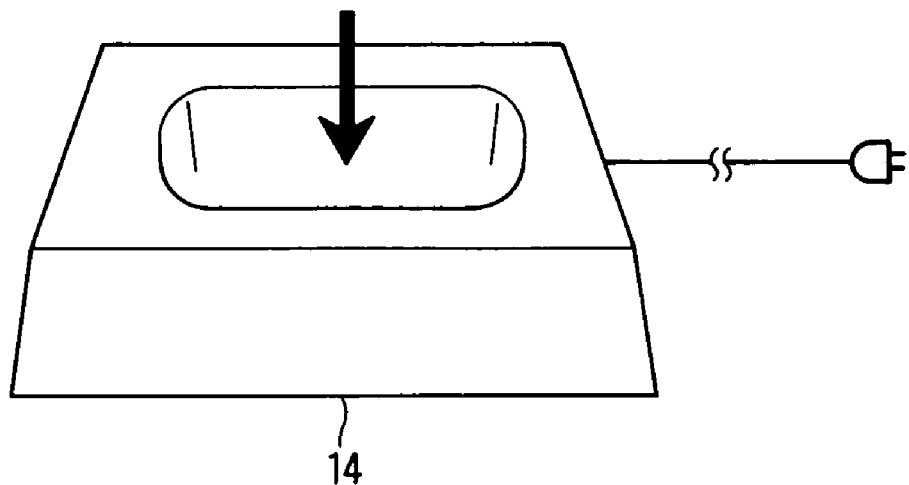

In this embodiment, as shown in FIGS. 4 and 5, the control unit 1 is further connected to a charge control unit 13, which is connectable to an external desk-top type portable battery charger 14 and controls charging of the built-in battery 12 by the external power source. The battery charger 14 converts the commercial alternating current voltage 100 V to a direct current voltage 5.8 V. While the cellular video telephone is mounted on the battery charger 14, the charge control unit 13 in turn regulates the 5.8 V output of the battery charger 14 to 4.1 V to charge the built-in battery 12 therewith, and stops its charging operation when the battery 12 is fully charged.

Figure 6:
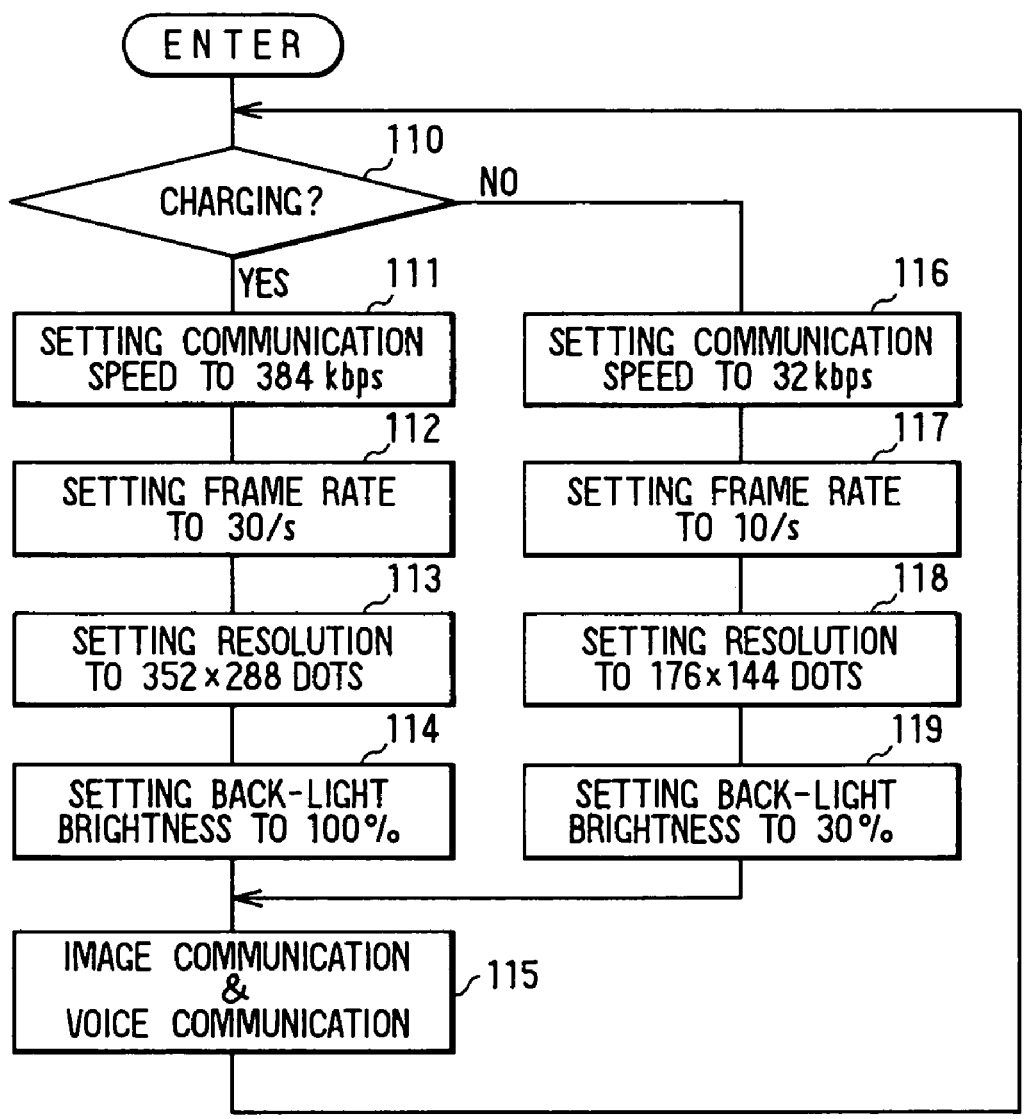
FIG. 6 is a flow diagram showing a communication control routine of the radio communication terminal shown in FIGS. 4 and 5.

The control unit 1, particularly the microcomputer, is programmed to execute an interrupt routine shown in FIG. 6. This routine is initiated when the user completes inputting of the phone number of the opponent user (call-receiver) and pressing the SEND button on the keyboard unit 10.

In this processing, the control unit 1 first checks at step 110 whether the charge control unit 13 is connected to the battery charger 14 and the battery 12 is being charged by the battery charger 14. If the charge control unit 13 is in the battery charging operation (YES), the control unit 1 sets the communication speed to 384 k bps at step 111. Then, the control unit 1 sets the frame rate to 30/s (30 frames per second) at step 112, sets the image resolution to 352×288 dots at step 113, and sets the brightness of the back-light of the display 8 to its maximum, 100%, at step 114. The control unit 1 executes both of the image communication and the voice communication at step 115. Thus, as long as the battery 12 is being charged, the data communication and image display are attained at a highest possible speed and quality.

On the other hand, if the battery charger 14 is not connected nor the charge control unit 13 is in the battery charging operation (NO), that is, if the cellular video telephone is operated solely by the battery 12, the control unit 1 proceeds to step 116. In this instance, it may still be preferred to display the dynamic image on the display 8, even if the quality of the dynamic image display is lessened to some extent. That is, the image display is enabled with a slower motion speed of the dynamic image. Therefore, the control unit 1 sets the communication speed to a lower value, 32 k bps, at step 116. Then, the control unit 1 sets the frame rate to 10/s (10 frames per second) at step 117, sets the image resolution to 176×144 dots at step 118, and sets the brightness of the back-light of the display 8 to 30% of its maximum at step 119 for saving the power consumption. The control unit 1 executes both of the image communication and the voice communication at step 115 with the lowered speed and quality.

In the second embodiment, it is also possible to change the data communication speed into more than two stages based on the remaining electric power of the battery 12. It is also possible to turn off the power supply to the back-light of the display 8 or enable only the voice communication, when only the built-in battery 12 is available. Further, the control processing of FIG. 6 may be executed in dependence on the user's instruction on the keyboard unit 10, or the transmission speed, frame rate, image resolution and the display brightness may be set arbitrarily by the user. The amplification of the transmission voice signal and the received voice signal may be increased when the battery 12 is charged externally.

The present invention should not be limited to the disclosed embodiments and modifications. For instance, the present invention may be applied to a cellular video telephone having no cameras and displays. Thus, the present invention may be modified in various ways without departing from the spirit of the invention.

I claim:

1. A radio communication terminal having a built-in battery comprising:
 voice communication means for communicating a voice signal;
 image communication means for communicating an image signal;
 a power supply detector that detects if power is supplied from an external power source; and
 a controller that controls the voice communication means and the image communication means based on the detection by the power supply detector; wherein
 the voice communication means and the image communication means are available any time the power is supplied from the external power source, and
 the voice communication means is available while the image communication means is unavailable when the power is not supplied from the external power source.

2. A radio communication terminal having a built-in battery comprising:
 voice communication means for communicating a voice signal;
 image communication means for communicating an image signal;
 a power supply detector that detects if power is supplied from an external power source; and
 a controller that controls a transmission speed, the voice communication means, and the image communication means based on the detection by the power supply detector, wherein the voice communication means and the image communication means are available and the controller controls the transmission speed at a first speed any time power is supplied from the external power source, and the voice communication means and the image communication means are available and the controller controls the transmission speed at a second speed that is slower than the first speed when the power is not supplied from the external power source.

* * * * *